(No Model.)

M. G. BUNNELL.
MACHINE FOR MAKING AND REPAIRING ROADS.

No. 543,923. Patented Aug. 6, 1895.

Witnesses.
Fredk. H. Hills
Anna Ward

Inventor
Morton G. Bunnell
By Chas. G. Page
Atty.

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 543,923, dated August 6, 1895.

Application filed February 28, 1891. Serial No. 383,138. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to a construction of four-wheeled road-working machines involving a diagonally-adjustable scraper-blade arranged to extend across the space between the front and rear wheels, and a horizontally-swinging rear axle, which can be adjusted to different angles relatively to the body-frame so as to vary the position of the rear wheels relatively to the front wheels, vary the position of the rear wheels relatively to the diagonal adjustment of the scraper-blade, permit the blade to be set farther over to one side or the other, overcome side draft, and obtain various other useful ends.

The object of my invention is to provide novel and improved means for adjusting the rear axle; and to the attainment of these and other serviceable ends it consists in matters hereinafter set forth.

Figure 1:
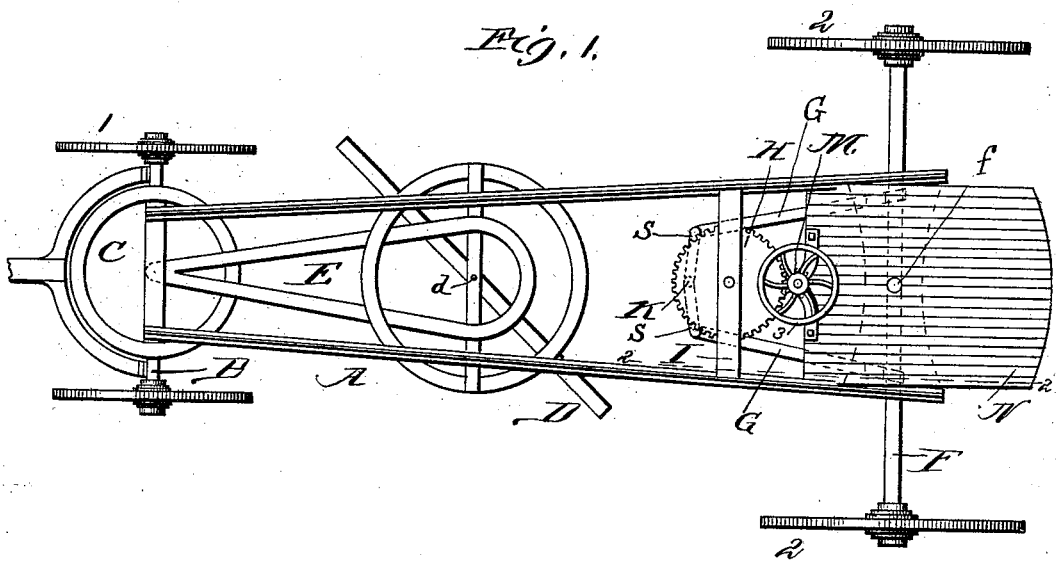
Figure 2:
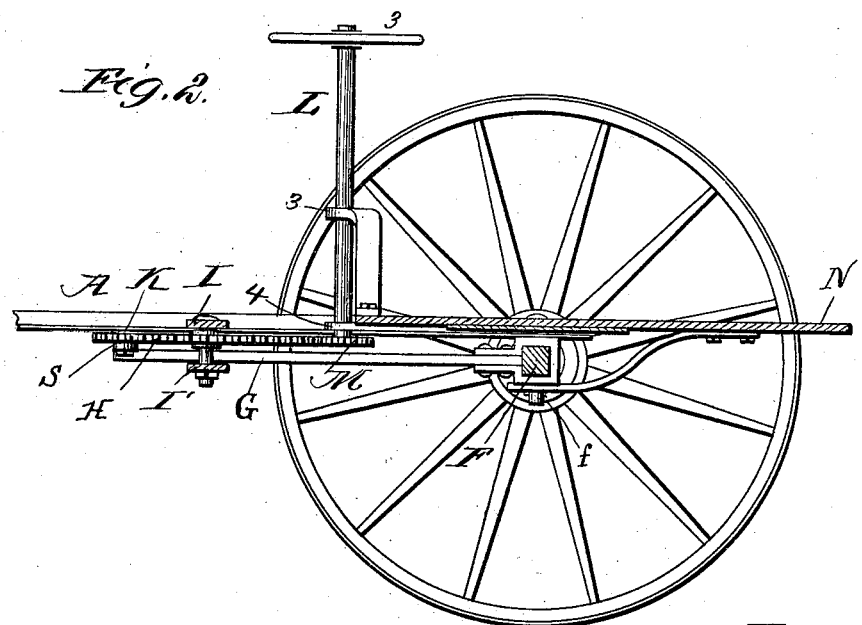

In the accompanying drawings, Figure 1 is a top plan view of a road-working machine embodying my invention, various known devices for effecting certain adjustments on the part of the blade being, for convenience of illustration, omitted. Fig. 2 represents on a larger scale a section on line *x x* in Fig. 1.

The body-frame A is at its forward end pivotally connected with and supported upon the front axle B, a preferred connection between the two being a fifth-wheel C, although any other suitable pivotal connection can be employed. The scraper-blade D is arranged to extend across the space between the front wheels 1 and rear wheels 2, and is also arranged for diagonal adjustment—that is to say, it is pivotally suspended below the body-frame, so that it can be swung horizontally about its longitudinal middle, so as to vary its horizontal angle relatively to the line of progression.

The scraper-blade can be pushed from the rear, but is preferably drawn by a horizontally and vertically swinging draft-bar E, which is pivotally held at the forward end of the machine. The scraper-blade can be pivotally connected with the draft-bar in any usual or desired manner, and is understood to be raised and lowered by any usual or desired raising and lowering mechanism, which need not be herein illustrated, it being observed, however, that efficient means for raising and lowering the blade, swinging it toward the side of the machine, and effecting its diagonal adjustment are embodied in Letters Patent of the United States Nos. 427,738 and 427,739.

The horizontally-swinging rear axle F is pivotally connected with the body-frame and provided with forwardly-extending arms or hounds G. A gear H is supported upon the body-frame, which can be provided with cross-bars I, arranged to provide bearings for the journals of said gear. These arms or hounds are at their forward ends connected with a wrist-pin E on gear H by means of links S, which are pivotally connected with said hounds and wrist-pin. The wrist-pin is arranged forward of the center of said gear, and hence is eccentric thereto, thereby providing, in effect, a crank connection between the gear and arms or hounds. By turning said gear the arms or hounds will be swung to one side or the other, according to the direction in which the gear is turned; and hence by thus swinging the arms or hounds the axle will be swung so that it can be set at any desired horizontal angle relatively to the length of the body-frame. As a means for operating the gear H, the body-frame carries a hand-wheel shaft L, provided with a cog-wheel M, which engages said gear. The hand-wheel shaft is supported by bearings 3 and 4 arranged upon the body-frame at the forward end of the rear platform N, so as to be readily available to an attendant standing upon said platform. The gear H operates as a crank or crank-wheel, and hence could be formed without teeth and turned in any suitable way.

What I claim as my invention is—

1. The combination in a road-working machine of a diagonally adjustable scraper-blade arranged between the front and rear wheels, a horizontally swinging rear axle provided with a forwardly extending arm or hounds, a rotary gear carried by the body-frame, and a crank connection between the rotary gear and said arm or hounds; substantially as set forth.

2. The combination substantially as hereinbefore set forth, in a machine for making and repairing roads, of a body-frame pivotally connected with the front axle, a diagonally adjustable scraper-blade arranged to extend across the space between the front and rear wheels, a horizontally swinging rear axle provided with forwardly extending arm or hounds, a gear H supported upon the body-frame and connected with said arm or hounds by a crank connection forward of its pivotal support, a pinion supported upon the body-frame and arranged to engage the gear H, and a rotary shaft for operating said pinion.

MORTON G. BUNNELL.

Witnesses:
HARRY C. KENNEDY,
FREDK. H. MILLS.